Aug. 10, 1965  J. K. MILLER  3,200,409
METHOD OF AND APPARATUS FOR MAKING AND PROJECTING
STEREOSCOPIC PICTURES EMPLOYING A SPHERICAL
MIRROR SEGMENT
Original Filed July 17, 1958
2 Sheets-Sheet 2
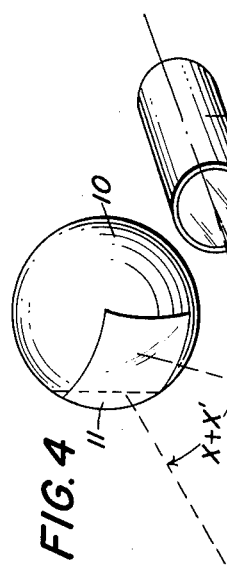
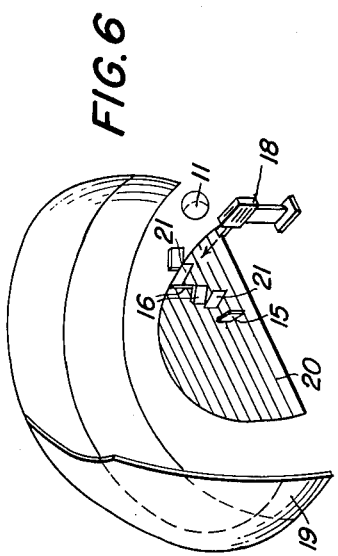
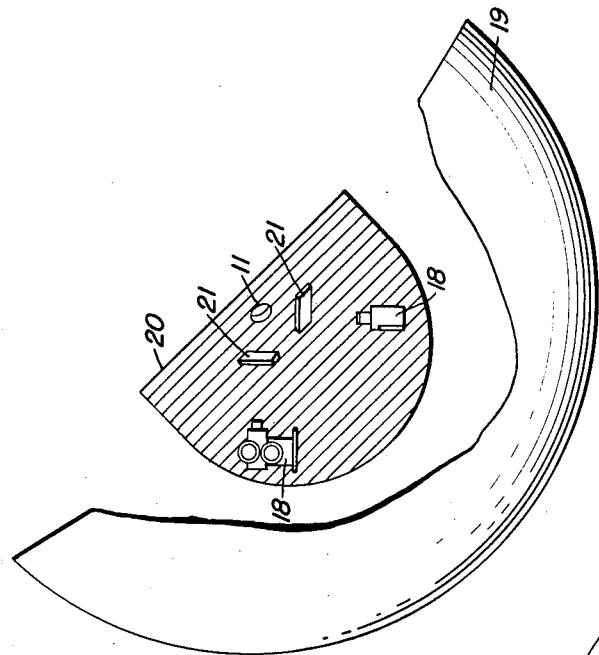
INVENTOR
JAMES K. MILLER
BY *Raymond B. Liddle*
ATTORNEY

United States Patent Office 3,200,409
Patented Aug. 10, 1965

3,200,409
METHOD OF AND APPARATUS FOR MAKING AND PROJECTING STEREOSCOPIC PICTURES EMPLOYING A SPHERICAL MIRROR SEGMENT
James K. Miller, 326 Acacia, Lake Jackson, Tex.
Original application July 17, 1958, Ser. No. 749,158, now Patent No. 3,083,612, dated Apr. 2, 1963. Divided and this application Mar. 13, 1963, Ser. No. 266,136
8 Claims. (Cl. 352—60)

This is a division of my copending application Serial No. 749,158, filed July 17, 1958 now Patent No. 3,083,-612.

This invention relates to an improved method of photographing and projecting stereoscopic pictures and more particularly relates to the use of a spherical mirror segment therein.

Methods of recording and projecting stereoscopic or 3-dimensional pictures have been known for many years, first in the field of still photography and more recently in the field of motion pictures. The method employed in the past to produce stereoscopic motion pictures has been, in general, to take two photographs of the same scene, simultaneously, from two physically different positions with two different cameras. The camera lenses were spaced about two and one-half inches apart to correspond to the interocular distance between the human eyes. As a practical matter, the cameras employed were generally so bulky that it was quite difficult to space the lenses the proper distance apart in a side-by-side relationship. Therefore, prisms or reflectors were generally used to allow separation of the point of view of the lenses by a proper amount and yet maintain a practical system to manipulate. Using polarized light, the separate scenes, thus photographed, were then projected simultaneously on a screen and viewed through a polarized viewing aid such that each eye viewed its own picture and that picture alone.

The object of stereoscopic motion pictures has been to simulate the viewing of the scene by the human eye, to give the illusion of depth, realism, and a sensation that the viewer is seeing the actual scene. The ultimately desired situation is for the projected scene to be environmental to the viewer to the extent that all things bear the same natural space relationships to each other as would exist when viewing the actual scene. This feeling of actual presence in the scene is a highly desirable, but up to now, unobtainable effect.

In order to obtain the total sensation of presence in the scene, it is necessary that two conditions exist. First, the scene viewed must appear to have depth, so that objects have a proper space relationship to one another, rather than appearing flat or two-dimensional. Second, the scene and its action must extend to, or beyond, the peripheral vision of the viewer in both the horizontal and vertical planes, so that the eyes of the viewer see nothing but a scene in proper stereoscopic space relationship.

While both stereoscopic and cycloramic motion pictures are known, no commercial process is used which incorporates both features. Individually, they both possess certain inherent difficulties which have rendered them incompatible or impractical, and no known combination of the known systems or procedures will produce a sensation of realism to the extent that the viewer feels present in the scene.

One of the problems of stereoscopic projection has been the synchronization of the two projectors which were necessarily employed. It is necessary, of course, that the two projectors be in perfect synchronization, for any slight time lapse between the two projected scenes will destroy the desired illusion of depth as well as cause strain to the eyes of the viewer. Even when proper synchronization is accomplished, it requires elaborate and expensive equipment and depends upon a high degree of skill on the part of the projector operator.

Another problem encountered in stereoscopic projection, particularly when it is desired in combination with cycloramic techniques, is that many lenses and lens systems are physically so bulky that they cannot be spaced, or even modified by periscopic reflector systems, to obtain the two and one-half inch distance between centers to correspond to the human interocular distance. This renders such systems completely impractical for stereophotography.

Some methods of production of cycloramic motion pictures likewise involve the use of a plurality of cameras to take the pictures and a plurality of projectors to project them. In these systems, lines are formed between the various sections of the scene projected. This detracts from the environmental effect of the picture.

In order to produce the highly desirable cycloramic motion picture scenes, an anamorphic lens is generally employed in the cameras and projectors. It is known that to produce two lenses of this type which have identically matched optical properties is very difficult or impossible. While the exact matching of lenses is not a substantial problem with standard lenses, great difficulty is incurred in matching of two or more anamorphic lenses. In stereo photography, if this matching of the two camera lenses and of the two projectors' lenses is not carefully executed, the entire effect is lost.

It is, therefore, an object of this invention to provide an improved method of photographing and projecting stereoscopic motion pictures.

It is a further object of this invention to provide a method of photographing and projecting a stereoscopic scene of near hemispherical scope.

It is a still further object of this invention to provide a method of photographing a scene such that upon projection the natural space relationships will have been preserved.

In the drawings:

FIGURE 2 is a side elevation of FIGURE 1.

FIGURE 3 is a plane projection showing the single camera arrangement for photographing scenes for stereoscopic projection.

FIGURE 4 is a front isometric view of FIGURE 3.

FIGURE 5 is an isometric schematic view of the projection arrangement employing two projectors.

FIGURE 6 is an isometric schematic view of the projection arrangement employing a single projector.

Figure 1:
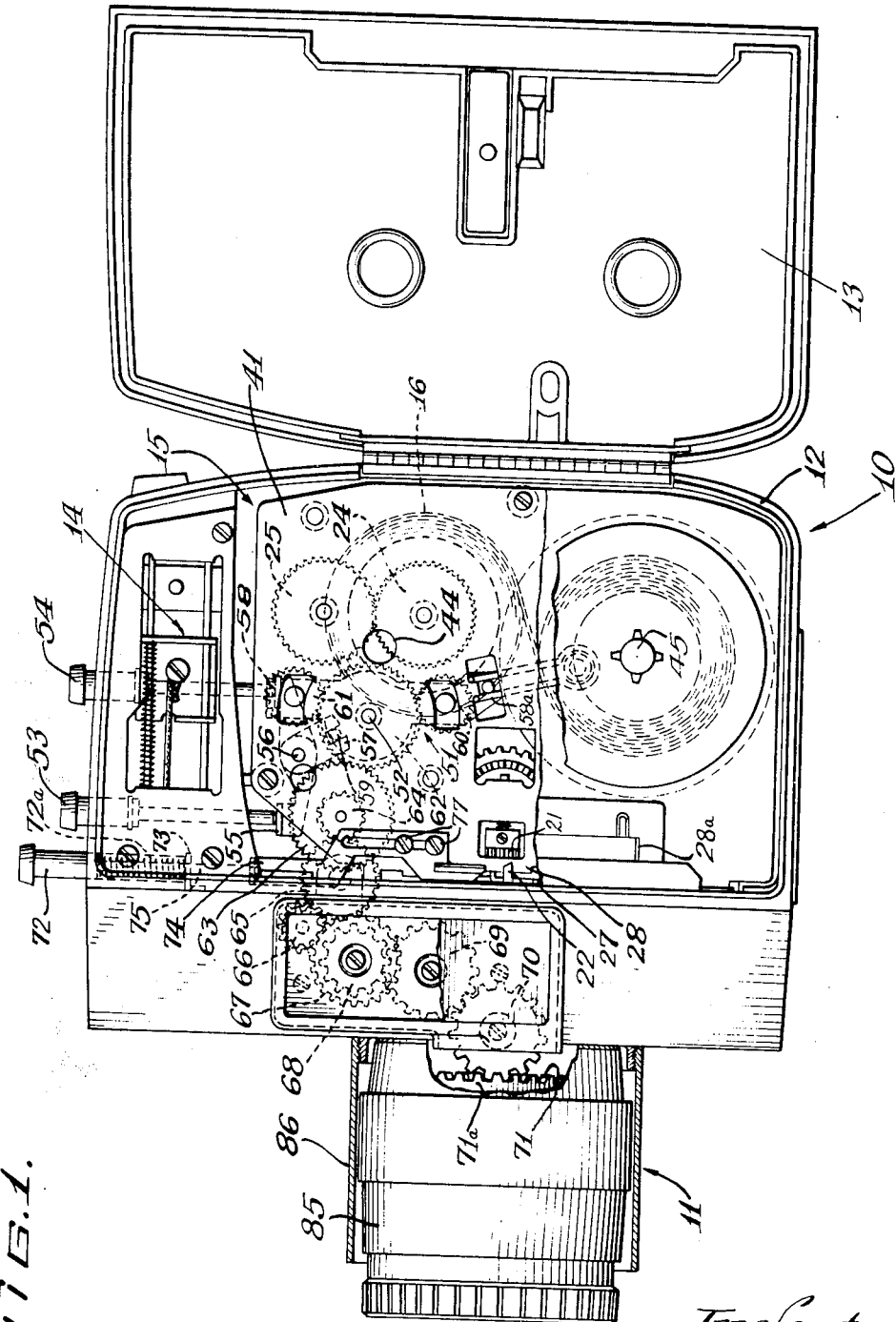
FIGURE 1 is a plane projection showing the two camera arrangement for photographing scenes for stereoscopic projection.

It has been found that the objects of this invention may be accomplished by reflecting an image from a convex mirror into two cameras laterally spaced in front of the mirror, positioned angularly thereto and above or below the center line thereof. By employing this method, it is possible to photograph a scene or view, which not only has a scope equivalent to or greater than that of the human eye, but which when projected on an appropriate screen and to an appropriately placed audience, is amazing in its stereoscopic illusion of depth and proper space relation of objects within the scene.

A system even superior to the two camera arrangement described above may be produced by reflecting an image from a convex mirror into two flat mirrors disposed in front of the convex mirror, positioned angularly thereto and above or below the horizontal center line thereof. Reflecting the image from these flat reflectors into two reflectors which are between the first-named flat reflectors and finally reflecting the image from these reused but only negligible distortion will result if no change in angle is made.

As the instant process photographs a virtual image of small depth in a spherical mirror, depth of field requirements on the camera are almost constant and quite small regardless of the distance from spherical mirror to scene. This allows stereoscopic pictures to be taken using large lens apertures and slow fine grain negative film and maintain sharp images without the usual difficulties with focus or depth of field.

The flat reflectors which reflect the image from the "outside," flat mirrors must be positioned so as to receive the substantially complete image therefrom and converge this image at the camera lens. This is an arrangement easily determined after properly locating the outside pair of plane mirrors.

By "inside pair" of mirrors is meant the two plane mirrors located closest to the vertical plane passing through the center of the spherical mirror and the camera. By "outside pair" of mirrors is meant the two mirrors the greatest distance from the vertical plane passing through the center of the spherical miror and the camera.

The two images reaching the camera will be recorded side-by-side on a single frame of film. They will be greatly distorted, but this distortion will be resolved to a completely normal space relationship by proper projection back through the same general optical system and using an appropriate screen. If it is desired to record the two images, one above the other on a single film frame, this is easily accomplished by placing one inside mirror on top of the other and adjusting each outside mirror so that it will be in the same plane as its corresponding inside mirror.

When a spherical mirror is used in conjunction with two cameras or a series of flat reflectors and one camera, as described herein, a stereoscopic picture is produced which, on projection, is superior in realistic effect to any known stereoscopic system. Objects in a picture so taken and reproduced on the concave surface of a spherical segment screen, with the optical center of the spherical mirror at the center of curvature of the screen, will appear to bear the same space relationship to one another as though the viewer were actually present in the scene. This realistic sensation of depth combined with a picture covering the entire visual area of the viewer, produces, for the first time, the sensation of being actually present in the scene. The feeling of viewing the actual scene has been approached before, but no satisfactory system has been developed for producing the environmental sensation of this process. This effect is partially due to the fact that the spherical mirror, when used as herein described, is so very similar to the human eye. That is, while the picture directly in front of the viewer is very clear, the extreme periphery may be slightly less distinct and tend to reveal film grain. The human eye possesses a comparable characteristic, that is, it sees most clearly directly ahead and the inclusion of this characteristic in a stereoscopic, cycloramic picture produces amazing realism.

The projection of film produced by the instant process is merely the reverse of photographing, except for the addition of polarizing filters or other means of causing each eye of the viewer to view its own picture and that picture alone. In the two camera system, the projectors are mounted below a spherical mirror in the same relation as the photographing cameras had been. A scene is projected from the projectors to the spherical mirror through polarizing filters and thence to a concave screen of the same configuration as the mirror, which had been treated to maintain the polarized quality of the light. If the single camera process is used to make the film, a similar reflector arrangement is used in projection with the plane mirrors and a projector in the same relationship to the spherical mirror. The scene will be projected to the inner pair of mirrors, reflected to the outer pair of mirrors through polarizing films, again reflected to the spherical mirror and thence to the concave screen. The polarizing films employed are oriented to polarize the two images 90 degrees out of phase with each other. The viewers then wear polarizing viewing aids so that each eye views its own intended picture and that picture alone, as the eye pieces of the viewing aids are polarizing films oriented directly in phase with the image intended therefor. If the stereoscopic cycloramic picture is viewed from within the area surrounded by the near-hemispherical screen, a complete feeling of presence in the scene is obtained.

For further details of the invention, reference may be had to the drawings. In FIGURE 1, a plane view of the two camera system, spherical mirror 10 reflects a scene of substantially 180 degrees scope which reflection is photographed by cameras 14—14. Spherical mirror segment 11 is that segment of the spherical mirror 10 whose base is formed by rotating radii R—R, whose angle of intersection is 90 degrees, about their bisecting line as an axis and intersecting the spherical reflector surface 10. This defines the optical center 13 of the lens as the center of the circle C—C. The convex surface of spherical mirror segment 11 so formed has the same properties for purposes of this invention as the complete sphere and may be used interchangeably therewith. The two cameras 14—14 photograph the same reflected scene from two physically different positions in order to produce the stereoscopic effect from projection. The horizontal angular displacement of cameras 14—14 from the vertical plane B—B bisecting the segment 11 and passing through the center of curvature 12 of sphere 10 forms angles X and X'. Angle X equals angle X'. A line is drawn which passes through the central point of the lenses of cameras 14—14 and intesects the surface of the spherical mirror segment 11 at points 17—17 which are each a distance A from plane B—B. A is a distance which is equal to one-half the human interocular distance or about one and one-fourth inches. The total distance between these points of intersection with the periphery of the mirror 17—17, therefore, is equal to the human interocular distance or about two and one-half inches.

By way of illustration of the necessary angular displacement X and X' for cameras 14—14 from plane B—B, a radius of curvature R of spherical mirror 10 of 6.25 inches is assumed. Using the generally accepted two and one-half inches as the human interocular distance, A equals one and one-fourth inches and angles X and X' are each 23 degrees and 4 minutes. The camera must, therefore, lie out along a line which passes through point 17 and forms an angle 23 degrees and 4 minutes with the vertical plane B—B. The distance from reflector to camera will vary depending largely on the focal length of the camera lens employed.

FIGURE 2 is a side elevation of the two camera system. Plane E—E is a horizontal plane passing through the center of curvature 12 of and bisecting spherical mirror 10 and spherical mirror segment 11. Angle Y establishes the vertical displacement of camera 14 from plane E—E and angle Z is the angular displacement of the optical axis of the camera 14 from the line which connects the center of curvature 12 with the center of the lens of camera 14. Angle Y may be above or below plane E—E but below is preferred. Angle Y must be sufficiently large to prevent the cameras 14—14 from appearing in the center of the photographed scene. Angle Z must be adjusted to permit the camera to view the entire desired reflected scene.

For example, if a spherical mirror with a radius of curvature of 6.25 inches were employed, angle Y would generally be from 12 to 25 degrees but is most particularly governed by the particular mass of camera which must be lowered enough not to obstruct the scene. Angle Z would be an angle of from 1 to 12 degrees.

FIGURE 3 is a plane projection of the single camera system wherein camera 14 is located below the spherical mirror segment 11. The scene forward of plane C—C will be reflected from the spherical mirror segment 11 into the outside pair of plane reflectors 15—15, to the inside plane reflectors 16—16 and thence into the lens of camera 14. In order to obtain the excellent stereoscopic properties of the invention, the center point of the flat reflectors 15—15 must be at equal angles from the vertical plane B—B, and of a magnitude given by the formula hereinbefore stated. For example, if spherical mirror 10 has a radius R of 6.25 inches and assuming the human interocular distance to be two and one-half inches. A equals one and one-fourth inches and angles X and X' equal 23 degrees and 4 minutes.

Plane mirrors 16—16 are situated in the same horizontal plane as plane mirrors 15—15. It is then easily possible to position internal mirrors 16—16 with respect to external mirrors 15—15, so as to reflect the two images into the camera 14 by anyone familiar with simple optics.

FIGURE 4 is a front isometric projection of the single camera system showing the spacial relationship of the camera 14, the spherical mirror 10, or spherical mirror segment 11, and the plane mirrors 15—15 and 16—16. Angles Y and Y' represent the angular displacement of the plane mirrors 15—15 below the horizontal plane E—E, passing through the center of curvature of and bisecting the spherical mirror 10. Angles Y and Y' should be equal angles of sufficient magnitude to prevent the image of the mirrors from obstructing the desired scene. As the camera 14 now faces the scene to be photographed this system may be easily built and used as one compact unit. While the description above is the preferred embodiment of the invention, many obvious variations may be made within the scope thereof. For instance, the system of plane mirrors may be mounted above the central bisecting horizontal plane of the spherical mirror as well as below it. The preferred embodiment of the invention records two images laterally disposed or side-by-side on each frame of film. If it is desired to have the two images vertically disposed on the film, this may be accomplished by placing one inside mirror 16—16 atop the other, rather than side-by-side. The companion outside mirror must be then placed in the same horizontal plane with the inner mirror. The outside mirrors will then have different angles Y and Y'.

FIGURE 5 is an isometric view of the projection arrangement employing film from the two camera system. Images are projected from separate synchronized projectors 18—18 through polarizing filters 21—21 to spherical mirror segment 11. The polarizing filters are oriented 90 degrees out of phase with each other. In this invention, projecting is merely the reverse of photographing except for the addition of polarizing media and therefore the angular relationships between the components of the projection system are the same as they are for the photographing system. The distance from projector lens to spherical reflector will depend on the focal length of the lenses used. It will be noted that the screen 19 is a concave segment of a sphere therefore similar in shape to portions of the spherical mirror segment 11 used to project the scene. The viewer, wearing polarized viewing aids oriented to admit the proper image to the proper eye and located in seats 20, will therefore be surrounded by a fully stereoscopic picture to the limit of his vision in both the horizontal and vertical planes except for the theater seating equipment before him.

FIGURE 6 is an isometric view of the projection arrangement employing the single camera system. Each of the two images from a frame of film are projected from projector 18 to one of the angularly mounted inside reflectors 16—16, from there to the angularly disposed outside reflectors 15—15 passing through polarizing filters 21—21, thence to the spherical mirror segment 11 and finally to screen 19. As hereinbefore stated, projection is simply the reverse of photographing and therefore, all of the elements of the projection system are in the same angular relationships as the corresponding photographing system with the exception of the addition of polarizing filters. The screen 19 is a concave segment of a sphere corresponding in configuration to the spherical mirror segment 11 used in projecting the scene. It will also be noted that the viewer in seats 20, wearing polarizing glasses is surrounded by a stereoscopic picture to the limit of his horizontal and the greatest part of his vertical vision.

The angular displacement $x$ and $x'$ of the two projectors in the two-camera system or of the outside mirrors for one projector operation must follow the law applying to photographing herein described:

$$X = 2 \text{ arc sin} \frac{A}{R}$$

This permits use of a spherical reflector segment in projection of a different radius than that used in photographing and resulting in satisfactory stereoscopic projection.

What is claimed is:

1. An improved method of photographing and projecting stereoscopic, cycloramic motion pictures which comprises simultaneously reflecting an image from a convex mirror into two cameras laterally disposed in front of the convex reflector, angularly disposed thereto and on a different horizontal plane therefrom, and reversing the procedure to project the image through polarizing media to a screen.

2. An improved method of photographing and projecting stereoscopic motion pictures which comprises simultaneously reflecting an image from a spherical mirror into two cameras positioned on a different plane therefrom and laterally displaced therefrom by an angle X derived from the equation $$X = 2 \text{ arc sin} \frac{A}{R}$$

wherein A is one-half the human interocular distance and R is the radius of curvature of the spherical mirror, and reversing the procedure to project the image through polarizing media to the concave surface of a screen having the same configuration as the spherical mirror.

3. An improved method of photographing and projecting stereoscopic, cycloramic motion pictures which comprises simultaneously reflecting an image from a spherical mirror into two cameras positioned therebelow and laterally displaced from the vertical plane passing through the center of curvature thereof by an angle X derived from the equation $$X = 2 \text{ arc sin} \frac{A}{R}$$

wherein A is one-half the human interocular distance and R is the radius of curvature of the spherical mirror, and reversing the procedure to project the images through polarizing media to the concave surface of a screen having the same configuration as the spherical mirror.

4. A method of photographing images for stereoscopic projection which comprises simultaneously reflecting an image from a spherical mirror segment into two cameras positioned in a different horizontal plane therefrom and laterally displaced from the vertical plane passing through the center of curvature thereof by an angle X derived from the equation $$X = 2 \text{ arc sin} \frac{A}{R}$$

wherein A is one-half the human interocular distance and R is the radius of curvature of the spherical mirror.

5. An improved optical system for photographing stereoscopic cycloramic pictures which comprises two cameras, a convex spherical mirror on a different horizontal plane from said cameras, said cameras laterally and angularly disposed in front of said convex spherical mirror so as to simultaneously receive the same reflected picture therefrom.

6. An improved optical system for photographing pictures for stereoscopic, cycloramic projection which comprises two cameras and a convex mirror, said cameras positioned on a different horizontal plane from said convex mirror and said cameras spaced laterally on either side of the vertical plane, passing through the center of curvature of the convex mirror by an angle X derived from the following equation:

$$X = 2 \text{ arc sin } \frac{A}{R}$$

wherein A is ½ the human interocular distance, R is the radius of curvature of the convex mirror and R is greater than A.

7. An improved optical system for photographing pictures for stereoscopic, cycloramic projection which comprises two cameras, a convex mirror, said cameras positioned on substantially the same horizontal plane with one another but on a different horizontal plane from the said convex mirror and said cameras spaced laterally on either side of the vertical plane passing through the center of the curvature of the convex mirror by an angle X derived from the following equation:

$$X = 2 \text{ arc sin } \frac{A}{R}$$

wherein A is ½ the human interocular distance, R is the radius of curvature of the convex mirror and R is greater than A.

8. An improved device for projecting stereoscopic, cycloramic images which comprises a convex spherical mirror, a concave spherical segment screen of the same configuration as the convex spherical mirror, two projectors capable of projecting simultaneous images upon said spherical mirror, polarizing means between said projectors and said spherical mirror, said projectors arranged below said spherical mirror and angularly disposed thereto such that both images are projected equally thereon, said spherical mirror positioned at substantially the center of curvature of said concave screen so as to reflect the polarized images thereon.

References Cited by the Examiner
UNITED STATES PATENTS

| | | | |
|---|---|---|---|
| 1,957,745 | 5/34 | Wildhaber | 352—43 |
| 2,299,682 | 10/42 | Conant | 88—24 |

FOREIGN PATENTS

| | | |
|---|---|---|
| 766,674 | 1/57 | Great Britain. |
| 535,648 | 11/55 | Italy. |

JULIA E. COINER, *Primary Examiner.*

Aug. 10, 1965　　　M. G. TOWNSLEY　　　3,200,411
MOTION PICTURE CAMERAS
Filed Nov. 20, 1961　　　　　　　　　　　　8 Sheets-Sheet 1

Inventor:
Malcolm G. Townsley
By Robert F. Miehle,
J. R. Hall
Attys.